US007810469B2

(12) United States Patent
Vigild et al.

(10) Patent No.: US 7,810,469 B2
(45) Date of Patent: Oct. 12, 2010

(54) COMBUSTION CONTROL BASED ON A SIGNAL FROM AN ENGINE VIBRATION SENSOR

(75) Inventors: Christian Vigild, Aldenhoven (DE); Charles Tumelaire, Aachen (DE); Evangelos Karvounis, Aachen (DE); Daniel Roettger, Eynatten (DE); Thomas Brewbaker, Plymouth, MI (US); Michiel van Nieuwstadt, Ann Arbor, MI (US); Michael Hopka, Dearborn Heights, MI (US); Diana Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 986 days.

(21) Appl. No.: 11/470,385

(22) Filed: Sep. 6, 2006

(65) Prior Publication Data
US 2008/0053405 A1 Mar. 6, 2008

(51) Int. Cl.
*F02P 5/00* (2006.01)
*F02M 7/00* (2006.01)
(52) U.S. Cl. .............................................. 123/406.26
(58) Field of Classification Search ............ 123/406.21, 123/406.24, 406.26; 73/117.3; 701/111, 701/110
See application file for complete search history.

(56) References Cited

U.S. PATENT DOCUMENTS

| | | | | |
|---|---|---|---|---|
| 4,300,503 A | * | 11/1981 | Deleris et al. | 123/406.21 |
| 4,869,474 A | * | 9/1989 | Best et al. | 267/136 |
| 5,347,846 A | | 9/1994 | Kitano et al. | |
| 5,537,967 A | * | 7/1996 | Tashiro et al. | 123/192.1 |
| 6,082,326 A | * | 7/2000 | Schietecatte et al. | 123/299 |
| 6,273,064 B1 | * | 8/2001 | Scholl et al. | 123/406.24 |
| 6,411,886 B1 | * | 6/2002 | Morra et al. | 701/111 |
| 6,529,817 B2 | | 3/2003 | Torno et al. | |
| 2004/0084021 A1 | | 5/2004 | Zhu et al. | |
| 2004/0084034 A1 | | 5/2004 | Huberts et al. | |
| 2004/0084036 A1 | | 5/2004 | Porter et al. | |
| 2004/0088102 A1 | | 5/2004 | Daniels et al. | |

OTHER PUBLICATIONS

SAE 2006-01-0186, Beasley et al., "Reducing Diesel Emissions Dispersion by Coordinated Combustion Feedback Control", Detroit, MI, Apr. 3-6, 2006.
SAE 2000-01-0268, Vigild et al., "Avoiding Signal Aliasing in Event Based Engine Control", Detroit, MI, Mar. 6-9, 2000.

* cited by examiner

*Primary Examiner*—Hieu T Vo
(74) *Attorney, Agent, or Firm*—Julia Voutyras

(57) ABSTRACT

Feedback control of an internal combustion engine is performed based on a signal from a vibration sensor and a crankshaft angle sensor. An energy factor can be computed based on these sensor signals. A vector of energy factor can be computed as a function of crank angle degree over a particular window of engine rotation of interest. Based on the energy factor vector, combustion phasing can be estimated.

33 Claims, 4 Drawing Sheets

COMBUSTION CONTROL BASED ON A SIGNAL FROM AN ENGINE VIBRATION SENSOR

FIELD OF THE INVENTION

The invention relates to a method for characterizing the combustion behavior of an internal combustion engine based on the output of an engine vibration sensor and to a control system and a method for feedback control of the combustion of an internal combustion engine which are based on the former method.

BACKGROUND OF THE INVENTION

Conventional control systems for injecting fuel into internal combustion engines such as, for example, diesel engines typically operate in an open-loop control circuit. That is to say the injection time and the pulse width of the injection are extracted from permanently predefined characteristic diagrams or table memories which are stored in the engine's electronic control unit. Although such systems exhibit very fast control behavior, they are otherwise not very robust with respect to engine tolerances since the control strategy cannot be adapted in the case of faults. If, for example, the flow characteristics of an injector in a diesel engine changes as a result of wear phenomena, the pulse width used for the injector will no longer supply the engine with the desired quantity of fuel. This can result in higher emissions, higher fuel consumption, and increased noise and even damage to the engine. For these reasons, it is desirable to provide a feedback for combustion control in an internal combustion engine.

Combustion phasing can be utilized to correct injection control variables and composition of the cylinder charge. In this way, it is possible, for example, to compensate for service life drift of sensors and actuators such as an air mass flow rate sensor and a fuel injector.

However, such feedback control of an internal combustion engine depends on a feedback signal which can be used to characterize the combustion behavior. In this respect, measurements of the internal pressure of a cylinder have been proposed. A disadvantage of such measurements is the requirement of one sensor per cylinder, therefore, the high cost. Furthermore, the currently available sensors for the internal pressure of a cylinder exhibit a drift behavior and a relatively short service life. Direct access to the combustion chambers, which currently-available sensors require, is a problem.

The authors of SAE Paper 2006-01-0186 (M. Beasley, R. Cornwell, P. Fussey, R. King, A. Noble, T. Salamon, A. Truscott, and G. Landsmann: "Reducing Diesel Emissions Dispersion by Coordinated Combustion Feedback Control," 2006) discuss in-cylinder pressure sensor signals for feedback control to reduce emissions in diesel engines. The authors recognize that in-cylinder pressure transducers are infeasible for production use and state: "low production cost, block mounted accelerometers were selected as a low-cost option for evaluation. At the time of writing, development of state estimation algorithms from engine block mounted accelerometers was continuing and details of the study will be published at a later date."

It is well-known to use vibration sensors to detect knock in spark-ignition internal combustion engines. In that application, the major objective is to determine whether knock is occurring both reliably and robustly, i.e., over a wide range of operating conditions. Example references of such are U.S. Pat. Nos. 5,347,846 and 6,529,817. The inventors of the present invention have recognized a need to determine combustion phasing to use for feedback control. Such prior art knock detection does not provide the desired combustion phasing information It is known in the art to use the spark plug as an ionization sensor to detect combustion phenomenon, examples are show in US Patent Applications 2004084034, 2004084021, 2004084036, and 2004088102. A small voltage is imposed across the spark plug gap, such voltage being much smaller than sparking voltage which causes a spark to jump the gap. The current flow from one electrode to the other is indicative of the number of ions at the spark plug gap, which is related to the state of combustion, pressure, and other factors.

SUMMARY OF THE INVENTION

Against this background, the present invention makes available a simple, and at the same time robust, control of the combustion behavior of an internal combustion engine.

According to one aspect, the invention relates to a method for characterizing the combustion behavior of an internal combustion engine which is defined by the fact that said method comprises the calculation of an energy factor on the basis of the vibration sensor signal. Vibration sensors are routinely employed in spark-ignition internal combustion engines to detect auto-ignition (knocking). Knock occurs when uncombusted gases ignite prematurely ahead of the flame front causing uncontrolled combustion. If knock is severe, i.e., a large fraction of the inducted air-fuel charge autoignites and occurs over many cycles, the engine can be damaged. Thus, the vibration sensor signal is used to detect knock so that suitable countermeasures can be taken to avoid damage. The vibration sensor is commonly called a knock sensor, particularly when employed to detect engine knock on a spark ignition engine.

Figure 1:
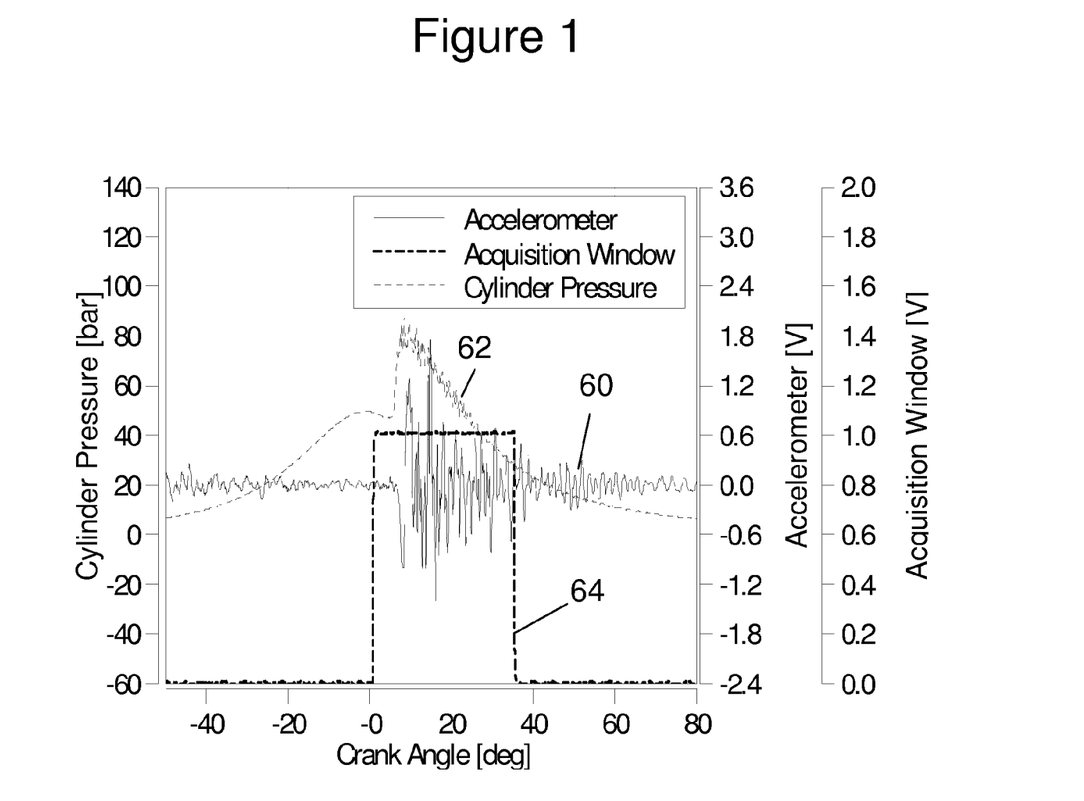
FIG. 1 shows cylinder pressure, raw vibration sensor signal, and windowing of the vibration sensor signal plotted as a function of crank angle degree.

Various types of vibration sensors are known in the prior art and are suitable for the present method. It is common to use an accelerometer, such as a piezoelectric type, mounted to the engine structure to detect engine vibration. The vibration sensor provides a signal representative of mechanical vibrations of the internal combustion engine. All sources of mechanical vibrations contribute to the signal: combustion pressure waves, piston slap, valvetrain vibration, etc. In FIG. 1, the relationship between the pressure 62 due to combustion in the combustion chamber is shown on the same time line as the raw vibration sensor signal 60. From FIG. 1, the time at which combustion is occurring corresponds to a greater intensity vibration sensor signal.

A method is disclosed in which an internal combustion engine is controlled based on an estimation of combustion phase, which is further based on a signal from a vibration sensor coupled to the engine, the sensor detecting engine vibrations. In the method a voltage or charge signal from said vibration sensor is acquired multiple times during a window of engine rotation. The level of the acquired signals are adjusted so that the mean value of the acquired signal values is zero. These adjusted, acquired signal values are bandpass filtered, which bandpass filter has calibratable upper and lower frequency limits. Further, the filter can be run in either a forward or forward-backward mode to cancel the phase delay due to the filter. These filtered, adjusted, acquired signal values are squared to obtain unfiltered energy factor values which are lowpass filtered to removed high frequency components to obtain filtered energy factor values. Alternatively, other powers, other than a $2^{nd}$ power can be used. In particular, first, third, and fourth powers can be used. The signal is rectified, so that, in particular, for the first and third powers, the output is positive. By summing the filtered energy factor values an energy vector is obtained. The crank angle degree at which p % of the maximum energy factor value has been obtained is determined by determining a crank angle, θp, which most closely satisfies:

$$E_{\theta_p} = p \cdot E_{\theta_n}$$

where $E_{\theta_n}$ is the maximum energy factor value and $E_{\theta_p}$ is the energy factor value at θp. The mass fraction burned angle can further be computed as a function of θp and engine rpm. The combustion phasing based on the energy factor vector can be used to control engine parameters affecting combustion.

The vibration sensor signal can be acquired as a function of the crankshaft angle, which is also acquired/computed. The crankshaft angle is related directly to the state of the internal combustion engine and the position of the pistons in engine cylinders. The relationship between the crankshaft angle and vibration sensor signal can describe the combustion behavior in a particularly informative way.

The described method can be carried out with analog signals. However, the acquisition and processing of signals is typically carried out in a digitized, discrete fashion with respect to time. In this case, the crankshaft angle is preferably determined with a resolution of less than 1°, particularly preferably of less than 0.5°. The resolution of the crankshaft angle signal in production engines is typically coarser than the desired 0.5°. The desired finer resolution is obtained by interpolation. According to one development of the invention, the vibration sensor signal data are analyzed in a crank angle window corresponding to the combustion event in a particular cylinder so that information relevant to combustion for the particular cylinder is not obfuscated by other engine events. In curve 64 of FIG. 1, windowing of the signal is demonstrated where vibration sensor data are considered only during the crank angle interval at which curve 64 is high and are not computed when curve 64 is low. The particular window, curve 64 of FIG. 1 is presented as an example and not intended to be limiting.

In one preferred implementation of the method, an energy factor, E(θ) as a function of crankshaft angle, θ, where K is the vibration sensor signal, as a function of crankshaft angle θ:

$$E(\theta) = \int_{\tau=\theta_0}^{\theta} |K^a(\tau)| d\tau; a = 1, 2, 3, \text{ or } 4.$$

Here, θo signifies a predefined (lower) integration limit, the crank angle of the beginning of the window and a is the power to which the signal is raised. Alternatively, the equation above can be recast in terms of time in place of crank angle degree.

$$E(t) = \int_{\tau=t_0}^{t} K^a(\tau) d\tau, a = 1, 2, 3, \text{ or } 4.$$

The signal energy computation for E(θ), which is defined above, operates on the signal K, which has preferably been filtered, rectified, and/or normalized, examples being provided below.

The invention also relates to a method for the feedback control of the combustion in an internal combustion engine in which a feedback signal is based on the energy factor. As has been explained, E can be acquired easily and, secondly, is very informative with respect to the combustion so that it permits simple and robust control of the operation of the internal combustion engine. Control signals which are influenced by the method may be here, in particular, the time or times, the number, the pulse width or widths of the fuel injection processes, the ignition time, the valve opening and closing times, the exhaust gas recirculation valve position, the position of the throttle valve, boost pressure on the engine intake, the fuel composition (when vehicle is supplied with 2 fuel tanks of differing combustion characteristics), spark timing (when engine is thusly equipped), etc.

In addition, the invention relates to a control system for an internal combustion engine which contains an input for the signal of the vibration sensor and is designed to carry out a method of the type explained above. That is to say the control system can calculate an array of energy factors on the basis of the profile of a vibration sensor signal and preferably use these for feedback control of the internal combustion engine. The vibration sensor is preferably a solid borne sound acceleration sensor such as, for example, a piezo knock sensor which is mounted on the engine to indicate mechanical vibrations. The control system can also be implemented by a microprocessor with associated components such as a memory and interfaces and with suitable software.

It is an advantage of the present method that the vibration sensor is commonly used in production on many internal combustion engines, thus the device is not cost prohibitive as with in-cylinder pressure transducers and the vibration sensor is known to be robust over the engine's lifetime. Although it is known to detect knock in a spark-ignition engine via a vibration sensor, it is not known to use a vibration sensor to detect combustion phasing in any engine type. A vibration sensor could be used to determine the timing of the onset of knock. However, because knock is a highly variable phenomenon, it can occur at any time after the start of normal, spark-initiated combustion, i.e., at best, combustion phasing is unrelated to the crank angle at which knock is first detected.

As mentioned above, spark plugs can be used to obtain an ionization sensor signal from which combustion parameters can be estimated. A further advantage of the present method is that it can be employed on engines not equipped with a spark plug, such as diesel engines and some HCCI engines. Furthermore, in engines with spark plugs, the method disclosed herein of using a vibration sensor to detect combustion phasing could be used in tandem with an ionization sensor method to provide an additional measure of combustion phasing to provide improved accuracy or as a backup in case of loss of one of the signals.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 2:
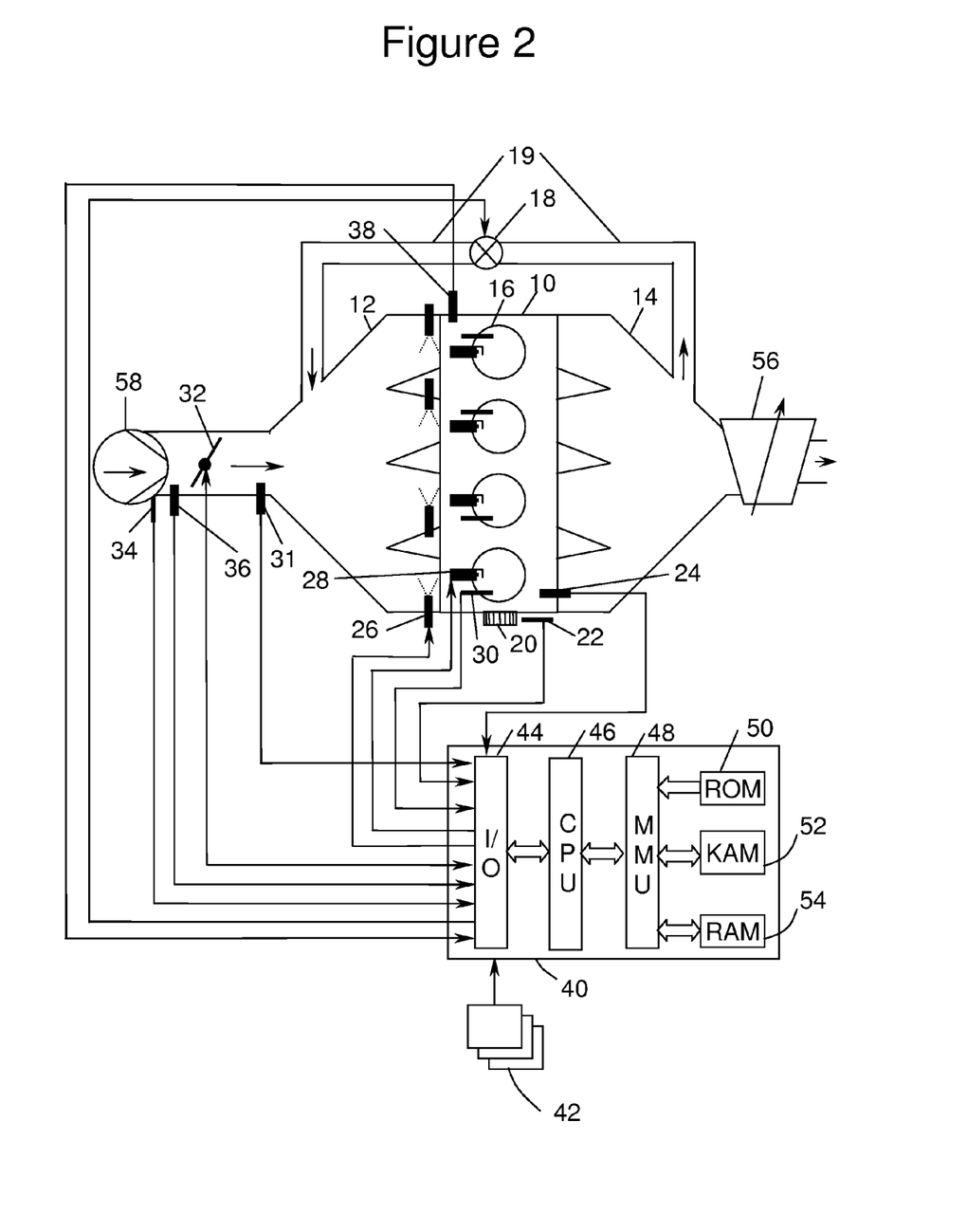
FIG. 2 is a schematic view of an internal combustion engine.

A 4-cylinder internal combustion engine 10 is shown, by way of example, in FIG. 2. Engine 10 is supplied air through intake manifold 12 and discharges spent gases through exhaust manifold 14. An intake duct upstream of the intake manifold 12 contains a throttle valve 32 which, when actuated, controls the amount of airflow to engine 10. Sensors 34 and 36 installed in intake manifold 12 measure air temperature and mass air flow (MAF), respectively. Sensor 31, located in intake manifold 14 downstream of throttle valve 32, is a manifold absolute pressure (MAP) sensor. A partially closed throttle valve 32 causes a pressure depression in intake manifold 12 compared to the pressure on the upstream side of throttle valve 32. When a pressure depression exists in intake manifold 12, exhaust gases are caused to flow through exhaust gas recirculation (EGR) duct 19, which connects exhaust manifold 14 to intake manifold 12. Within EGR duct 19 is EGR valve 18, which is actuated to control EGR flow. Fuel is supplied to engine 10 by fuel injectors 30, injecting directly into cylinders 16. For embodiments in which the engine is either a spark ignition engine or a spark-assisted, homogeneous-charge, compression-ignition engine, each cylinder 16 of engine 10 contains a spark plug 28. The engine may have port injectors 26. Such port injectors are often used with spark ignition engines to provide a mostly premixed fuel-air mixture to the engine. HCCI engines, in which a homogeneous charge is desired may also use a port injector. Diesel engine, which rely on compression ignition, sometimes supply a portion of the fuel in a premixed mode, sometimes called fumigation. This premixed portion may be supplied by port injectors or a carburetor (not shown). The crankshaft (not shown) of engine 10 is coupled to a toothed wheel 20. Sensor 22, placed proximately to toothed wheel 20, detects engine 10 rotation. Other methods for detecting crankshaft position may alternatively be employed. Sensor 24 is a vibration sensor, which in a preferred embodiment is an accelerometer mounted to the engine structure. Alternatively, sensor 24 is a microphone or other device capable of detecting vibration of the engine structure. Accelerometers provide a charge signal, which is known to be converted to a voltage signal prior to data collection. The vibrations of the engine structure which are caused by the combustion are sensed by vibration sensor 24. The signal of vibration sensor 24 is preferably directly lowpass-filtered to avoid alias effects (C. Vigild, A. Chevalier, and E. Hendricks: "Avoiding signal aliasing in event-based engine control", SAE Paper: 2000-01-0268, 2000).

Engine 10 of FIG. 2 is preferably pressure charged by a supercharger or turbocharger. The exhaust turbine 56 of a turbocharger is shown which is a variable geometry type. A turbocharger is coupled to an intake compressor by a shaft (not shown). By adjusting the variable geometry turbocharger, the amount of intake boost can be adjusted. The intake compressor 58 of FIG. 2 is either the turbocharger variety, which is shaft driven by the exhaust turbine or a supercharger, which is driven via the engine's crankshaft (connection not shown). The supercharger can be waste gate controlled to control intake boost.

Continuing to refer to FIG. 2, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve 32 position, spark plug 28 timing, EGR valve 18, boost pressure, etc. Various other sensors 42 and specific sensors (engine speed sensor 22, vibration sensor 24, engine coolant sensor 38, manifold absolute pressure sensor 31, air temperature sensor 34, and mass airflow sensor 36) communicate input through I/O interface 44 and may indicate engine rotational speed, vehicle speed, coolant temperature, manifold pressure, pedal position, engine vibration, throttle valve position, air temperature, and air flow. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

Figure 3:
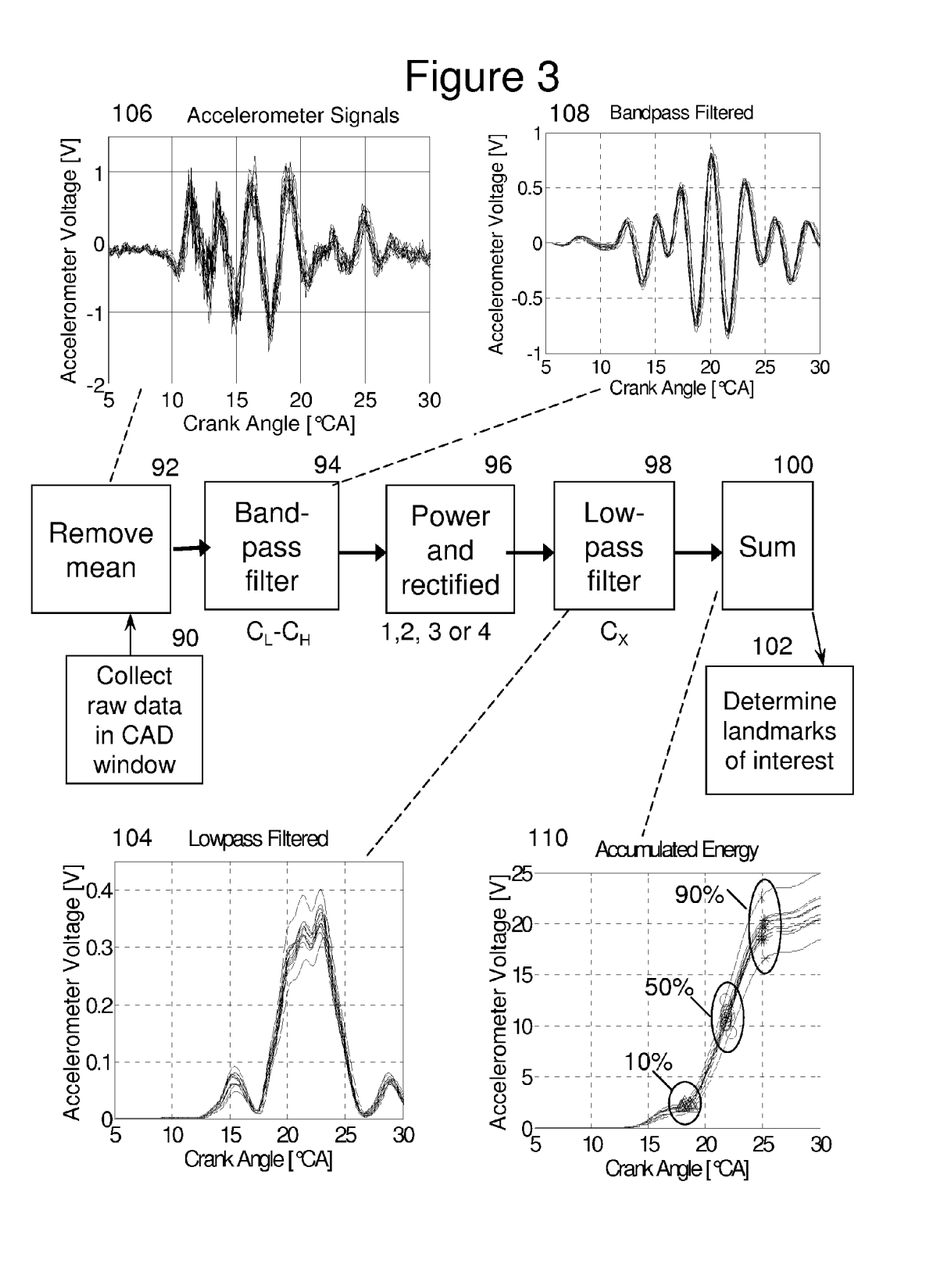
FIG. 3 is a schematic view the inventive method according to an aspect of the invention.

Referring to FIG. 3, the raw vibration sensor data are collected over a crank angle window in step 90. An example of a raw vibration sensor signal is shown as curve 60 in FIG. 1. In step 92, the data are adjusted so that the mean over the windowing interval is zero. Thus, the data set are either raised or lowered, as appropriate, to cause the data set to have a mean of zero. Curve 60 in FIG. 1 has an average voltage below 0, which is in contrast to plot 106 showing raw data, which has an average voltage at 0 (visually appears to be centered around zero). In step 94, the data are bandpass filtered removing frequency components below $C_L$ and above $C_H$. $C_L$ and $C_H$ are calibratable quantities which can vary depending on the engine architecture, mounting of the vibration sensor, engine speed, and any engine operating conditions. The filter can be run either forward or forward-backward to cancel the phase delay due to the filter. $C_L$ is expected to be of the order 1 kHz and $C_H$ of the order of 10 kHz. The filtered data appear as shown in graph 104 of FIG. 3. The data are squared in step 96, $K^2(\theta)$ per the equation above, when a=2. Alternatively, other powers can be used. The data are rectified (absolute value) and lowpass filtered in step 98 in which all frequency components above $C_X$ are removed, as shown in graph 108. $C_X$ is calibratable and may vary based on similar parameters as with $C_L$ and $C_H$. The data are summed in step 100, $$E_\theta = \sum_{\theta_0}^{\theta} K^2(\theta) \Delta\theta$$

forming a vector of the E values at each crank angle in the window from θo to θn, where θo is the starting crank angle and θn is the ending crank angle of the window of interest:

$$\vec{E}_\theta = [E_{\theta 0}, E_{\theta 1}, \ldots E_{\theta n}].$$

Plotting the values of the E vector with respect to crank angle results in the curves shown in graph 110. Because the data of graph 104 are positive, E, of graph 110, is a monotonically increasing function with its peak value occurring at θn, the end of the sampling window. Thus, the maximum E value is $E_{\theta n}$, or $E(\theta n)$. The 10%, 50%, and 90% combustion intensity times are shown in graph 110. These are computed as:

$$E_{\theta p} = p \cdot E_{\theta n}$$

where p is a percentage. Thus, if the crank angle of 50% combustion energy is sought, θp is the crank angle which satisfies the above equation, i.e., the crank angle at which $E_{\theta p}$ most nearly equals 50% of $E_{\theta n}$. Any percentage between 0 and 100% can be similarly determined.

The order of the operations shown in FIG. 3 can be altered without departing from the scope of the present invention. For example, the bandpass filtering of step 94 can be accomplished after computing the power of the signal, step 96. Another example is that the lowpass filtering of step 98 can occur after the summing operation of step 100.

The choice of the sampling window is important, but not terribly crucial because, as can be seen in curve 110, toward the end of the sampling window, the E curve becomes rather flat indicating that combustion is proceeding very slowly, if at all. Thus, very little increase in $E_{\theta n}$ would occur should the window be lengthened. Similarly, the slope of the curve near the initiation of rapid combustion is quite flat. The areas of rapid combustion, for the particular data collected in graph 110 happen between 10% and 50% combustion energy and right before 90% combustion energy.

It is known to one skilled in the art that certain combustion intervals are useful for characterizing combustion. It is common to compute the crank angle degrees of 5%, 10%, 20%, 50%, 80%, 90%, and 95% mass fraction burned as well as 5%-95% interval, 10%-90% interval, and 20%-80% interval. According to the present method, the crank angles associated with any percentage of the energy factor can also be computed. The combustion intensity relates to the rate of major fraction of the combustion interval; any of 5%-95%, 10%-90%, 20%-80%, or other intervals can be used.

Figure 4:
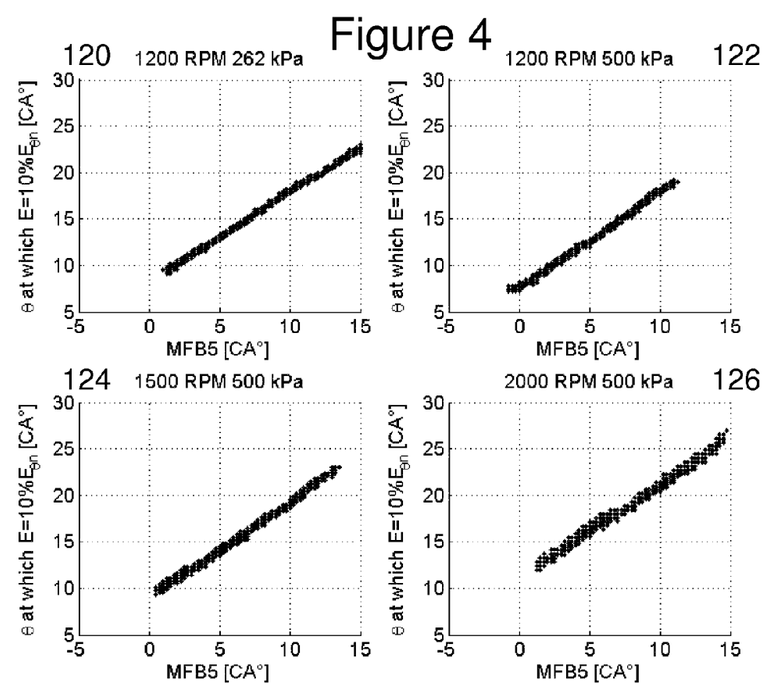
FIG. 4 shows data comparisons between prior art in-cylinder pressure transducer sensing calculations of combustion phasing compared the inventive method according to an aspect of the present invention.

Referring to FIG. 4, the data are compared between the prior art method, in which combustion phasing is determined via a pressure transducer signal, and the present method using a vibration sensor. In graph 120, the crank angle degree at which 5% of the fuel mass fraction is burned (MFB5 of the x-axis) is plotted against the 10% combustion energy, as computed by the present method, for an operating condition of 1500 rpm and IMEP (indicated mean effective pressure) of 262 kPa. The thick line in graph 120 represents hundreds of individual data points collected over which many engine parameters were varied: beginning of activation (BOA) of the fuel injector, EGR rate, and fuel cetane number. The two quantities correlate exceedingly well, with an offset of about 8°, in which the 10% E value, according to the present method, occurs about 8° after the MFB5 crank angle. This delay has several components: a delay in transmission of the pressure signals within the cylinder to the engine structure, a delay in transmission through the engine structure to the knock sensor location, and delays introduced by the filtering operations. The filters can be of lower or higher order. The higher the order, the more computationally intensive and the greater the delay introduced. However, at certain operating conditions, such a higher order may improve accuracy of the resultant energy factors. Another factor to consider relates to mechanical delays in engine vibrations traveling to the vibration sensor and other delays in the system. The correlation between MFB5 and 10% E value, in graph 120 of FIG. 4, is exceedingly linear with only a few outlier values. Furthermore, the delay of 8° is constant across the range of graph 120 regardless of the type of engine parameter that was varied. Similarly excellent correlations are shown in graphs 122, 124, and 126 of FIG. 4, which correspond to engine rpm conditions of 1200, 1500, and 2000 rpm, all at 500 kPa IMEP. All show linear correlations with nearly constant offsets; although the offset appears to be related to rpm; offsets are about 8°, 9°, and 11° for the 1200, 1500, and 2000 rpm conditions, respectively.

Figure 5:
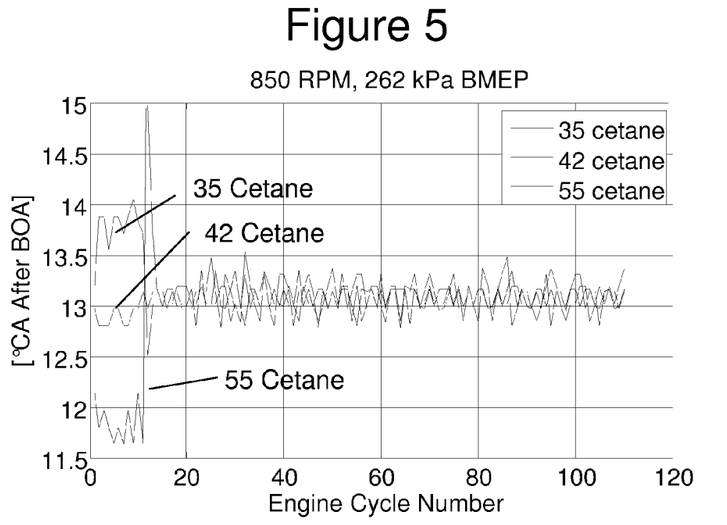
FIG. 5 is a plot of engine control using the inventive method when cetane number of the fuel is changed.

In FIG. 5, an engine was operated with 3 fuels of differing cetane number at an operating condition of 850 rpm and 262 kPA BMEP (brake mean effective pressure). Cetane number relates to the ability of the fuel to autoignite. The higher the cetane number, the more rapidly the fuel autoignites. Recall that in regard to a spark ignition engine autoignition is to be avoided. However, in regard to a compression ignition engine, autoignition is the phenomenon by which ignition occurs. It is desirable to have a fuel which rapidly autoignites because a delay in autoignition allows more fuel to mix with air and the resulting ignition event is harsher, leading to noise and undesirably high pressures in the cylinder. Prior to about cycle 10 in FIG. 5, the engine is operating open loop, i.e., no feedback based on the vibration sensor is being employed. The y-axis of FIG. 5 is a measure of the difference between BOA (when the fuel injector is activated) and the crank angle when the energy factor reaches 10% of its maximum value. As expected, the 35 cetane fuel takes longer, to reach the 10% point because it is a slower igniting fuel than the 55 cetane, which is a faster igniting fuel using (about 14° compared to about 12°, respectively). Feedback control of the injection timing is switched on at cycle 10. Although not shown in FIG. 5, when injection timing is feedback controlled to maintain a particular combustion phasing, the control system causes the 35 cetane injection timing to be advanced and the 55 cetane injection timing to be retarded such that the 10% energy factor point coincides for all three fuels after cycle 10 thereby providing the desired combustion phasing regardless of fuel cetane quality.

The signals can be sensed either in the time domain or in the crankshaft angle domain. When sampling in the time domain, there is a fixed time interval between the sampling points, and when sampling in the crankshaft domain there is a fixed crankshaft angle between the sampling points. Of course, the sampling can also be carried out according to other schemes and the sampling rate may, for example, vary (in the angle domain or in the time domain). In the last mentioned case, it is possible, in particular, to achieve a high signal resolution in specific signal ranges of interest.

For the desired characterization of the combustion behavior by the vibration sensor signal, correct synchronization with the crankshaft angle, θ, is highly significant. However, as a rule θ is sensed by a toothed disk on the flywheel, with angular resolutions of typically 3°, 5°, 6° or 10° are obtained, due to the distance between the teeth. In contrast, here higher resolutions up to 0.1° or less are desired. θ is therefore determined in engine control unit 40 with the necessary fineness by interpolation or extrapolation from the raw data. Interpolation can be applied when θ is not desired immediately, and can therefore be calculated as an intermediate value between two successive sampling points. Otherwise, if θ is to be used immediately, it is extrapolated from the preceding sampling points.

The lowpass and bandpass filtering may either be of the forward type or of the forward/reverse type. Filters of the forward type filter a signal only in the forward direction, that is to say the angle θ increases incrementally in such a filter. For this reason, forward filters are less computationally intensive and are suited for online calculations, i.e., for calculating current events. However, due to the nature of these filters they bring about a phase shift in the input signal. In contrast, filters of the forward/reverse type filter a signal both in the forward direction and in the reverse direction so that they can compensate phase shifts. However, they typically require a higher degree of expenditure on computation than corresponding forward filters and can only be used offline, for example in calculations between combustion events.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. An internal combustion engine, comprising:
an accelerometer affixed to the engine;
an engine rotation sensor proximate the engine; and
an electronic control unit electronically coupled to the engine and said accelerometer, said electronic control unit adjusting engine parameters based on signals from said accelerometer and said engine rotation sensor, said signals being used to estimate combustion phasing, wherein said engine parameters are at least one of injection timing and EGR rate, the engine having an EGR system which comprises a duct connecting an engine intake with an engine exhaust via an EGR valve, the engine also having one fuel injector per engine cylinder.

2. The engine of claim 1 wherein said engine has multiple accelerometers and signals from more than one accelerometer are averaged to compute combustion phasing in an engine cylinder.

3. The engine of claim 2 wherein said signal from said accelerometer is windowed to provide a dataset over a desired interval of engine rotation roughly corresponding with combustion in a particular engine cylinder.

4. The engine of claim 2 wherein said accelerometer signal is digitally acquired and filtered in said electronic control unit.

5. The engine of claim 1 wherein said combustion phasing is determined based on applying a function to said signal and integrating said accelerometer signal.

6. The engine of claim 5 wherein a combustion intensity is determined based on said combustion phasing.

7. The engine of claim 6 wherein said combustion intensity is based on a number of crank angle degrees for the major portion of the combustion event to occur.

8. The engine of claim 6 wherein said combustion intensity is based on a number of crank angle degrees between the 10% and 90% combustion times.

9. The engine of claim 5 wherein said function comprises one of: squaring, cubing, and taking the fourth power.

10. A method for controlling an internal combustion engine, comprising:
estimating combustion phase based on a signal from a vibration sensor coupled to the engine, said sensor detecting engine vibrations; and
adjusting an engine parameter based on said estimated combustion phase.

11. The method of claim 10 wherein said engine parameter is one of: number of injections per power stroke, injection timing, EGR rate, boost pressure, amount of fuel inducted, and injection rate.

12. The method of claim 10 wherein said internal combustion engine is a compression ignition engine.

13. The method of claim 10 wherein said engine parameter is one of: spark timing, injection timing, EGR rate, boost pressure, air-fuel ratio, and injection rate.

14. The method of claim 13 wherein said internal combustion engine is a spark ignition engine and said method is applied when said engine is undergoing non-knocking combustion.

15. The method of claim 10 wherein said sensor is an accelerometer affixed to the engine.

16. The method of claim 10, further comprising:
acquiring a voltage or charge signal from said vibration sensor multiple times during a window of engine rotation.

17. The method of claim 16, further comprising:
adjusting a level of said acquired signal so that the mean value of the acquired signal values is zero.

18. The method of claim 17, further comprising:
filtering said adjusted, acquired signal values with a bandpass filter.

19. The method of claim 18 wherein said bandpass filter has calibratable upper and lower frequency limits.

20. The method of claim 19, further comprising: rectifying said signal values when said power is odd.

21. The method of claim 18, further comprising:
raising said filtered, adjusted, acquired signal values to a predetermined power to obtain unfiltered energy factor values.

22. The method of claim 18 wherein said predetermined power is 1, 2, 3, or 4.

23. The method of claim 10, further comprising:
filtering said unfiltered energy factor values with a lowpass filter, said lowpass filter being calibratable.

24. The method of claim 23 wherein said lowpass and bandpass filters is run in one of a forward and a forward-backward mode.

25. The method of claim 23, further comprising:
summing said filtered energy factor values to obtain an energy vector.

26. The method of claim 25, further comprising:
determining a crank angle, θp, at which p % of the maximum energy factor value has been obtained by finding θp which most closely satisfies:

$$E_{\theta p} = p \cdot E_{\theta n}$$

where $E_{\theta n}$ is the maximum energy factor value and $E_{\theta p}$ is the energy factor value at θp.

27. The method of claim 26, further comprising:
estimating mass fraction burned crank angle based on the energy factor vector and engine rpm.

28. A method for controlling an internal combustion engine, comprising:
estimating combustion phase based on an energy factor, said energy factor being based on the absolute value of the power of one, two, three, or four of a signal from a vibration sensor coupled to the engine, said sensor used for detecting engine vibrations during a portion of engine rotation which corresponds roughly when combustion is occurring in one of the engine's cylinders.

29. The method of claim 28 wherein said vibration sensor signal is bandpass filtered with calibratable upper and lower limits, said bandpass filtering occurring prior to raising to said power of said sensor signal.

30. The method of claim 29 wherein said calibratable upper and lower limits are based on at least one of engine architecture and engine operating conditions.

31. The method of claim 28 wherein said power of said sensor signal is filtered in a lowpass filter which removes high frequency components, said lowpass filter cutoff being calibratable.

32. The method of claim 28 wherein said power of said sensor signal is summed to provide an energy factor vector:

$$\vec{E}_0 = [E_{\theta 0}, E_{\theta 1}, \ldots E_{\theta n}]$$

-continued where $$E_\theta = \sum_{\tau=\theta_0}^{\theta} K^2(\tau)\Delta\tau$$

where K is the sensor signal as a function of crank angle, $\theta$, and $\theta_0$ is a starting crank angle for the computation.

33. The method of claim 32 wherein said energy factor vector is computed over a window of crankangle degrees from to $\theta_0$ to $\theta n$, said $\theta_0$ to $\theta n$ being calibratable based on engine architecture and engine operating conditions.

* * * * *